United States Patent
Gauba

(10) Patent No.: US 9,100,906 B1
(45) Date of Patent: Aug. 4, 2015

(54) PARAMETERS FOR USER DEVICES IN WIRELESS ACCESS SYSTEMS BASED ON AZIMUTH ANGLE

(71) Applicant: Sprint Communications Company L.P., Overland Park, KS (US)

(72) Inventor: Maneesh Gauba, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 13/741,574

(22) Filed: Jan. 15, 2013

(51) Int. Cl.
*H04W 48/20* (2009.01)

(52) U.S. Cl.
CPC ..................... *H04W 48/20* (2013.01)

(58) Field of Classification Search
USPC .............. 370/328, 334, 339, 449; 455/24, 25, 455/63.4, 562.1, 575.7, 456.1, 456.5, 456.6
See application file for complete search history.

(56) References Cited

U.S. PATENT DOCUMENTS

| | | | |
|---|---|---|---|
| 6,236,866 B1 * | 5/2001 | Meyer et al. ............... | 455/562.1 |
| 7,123,928 B2 | 10/2006 | Moeglein et al. | |
| 7,881,263 B1 * | 2/2011 | Vargantwar et al. .......... | 370/331 |
| 8,045,526 B2 * | 10/2011 | Vargantwar et al. .......... | 370/331 |
| 2003/0236096 A1 * | 12/2003 | Yamazaki ................... | 455/456.6 |
| 2004/0259565 A1 * | 12/2004 | Lucidarme .................... | 455/453 |
| 2005/0032531 A1 * | 2/2005 | Gong et al. ................. | 455/456.5 |
| 2007/0264952 A1 * | 11/2007 | Buchwald et al. .......... | 455/186.1 |
| 2010/0093377 A1 | 4/2010 | Riley et al. | |
| 2011/0065439 A1 * | 3/2011 | Vargantwar et al. .......... | 455/437 |
| 2013/0005348 A1 * | 1/2013 | Sanders et al. ............. | 455/456.1 |

FOREIGN PATENT DOCUMENTS

WO   WO 2010131900 A2 * 11/2010

* cited by examiner

*Primary Examiner* — Benjamin H Elliott, IV

(57) ABSTRACT

Systems, methods, and software for providing parameters to user devices in wireless access systems are provided herein. In one example, a method of operating a wireless communication system is provided. The method includes providing wireless access to communication services to a user device in a sector of wireless coverage. The method also includes identifying an azimuth angle within the sector of wireless coverage corresponding to a position of the user device, and processing at least the azimuth angle of the user device to identify at least one parameter for the wireless access provided to the user device. The method also includes transferring the at least one parameter to the user device.

18 Claims, 5 Drawing Sheets

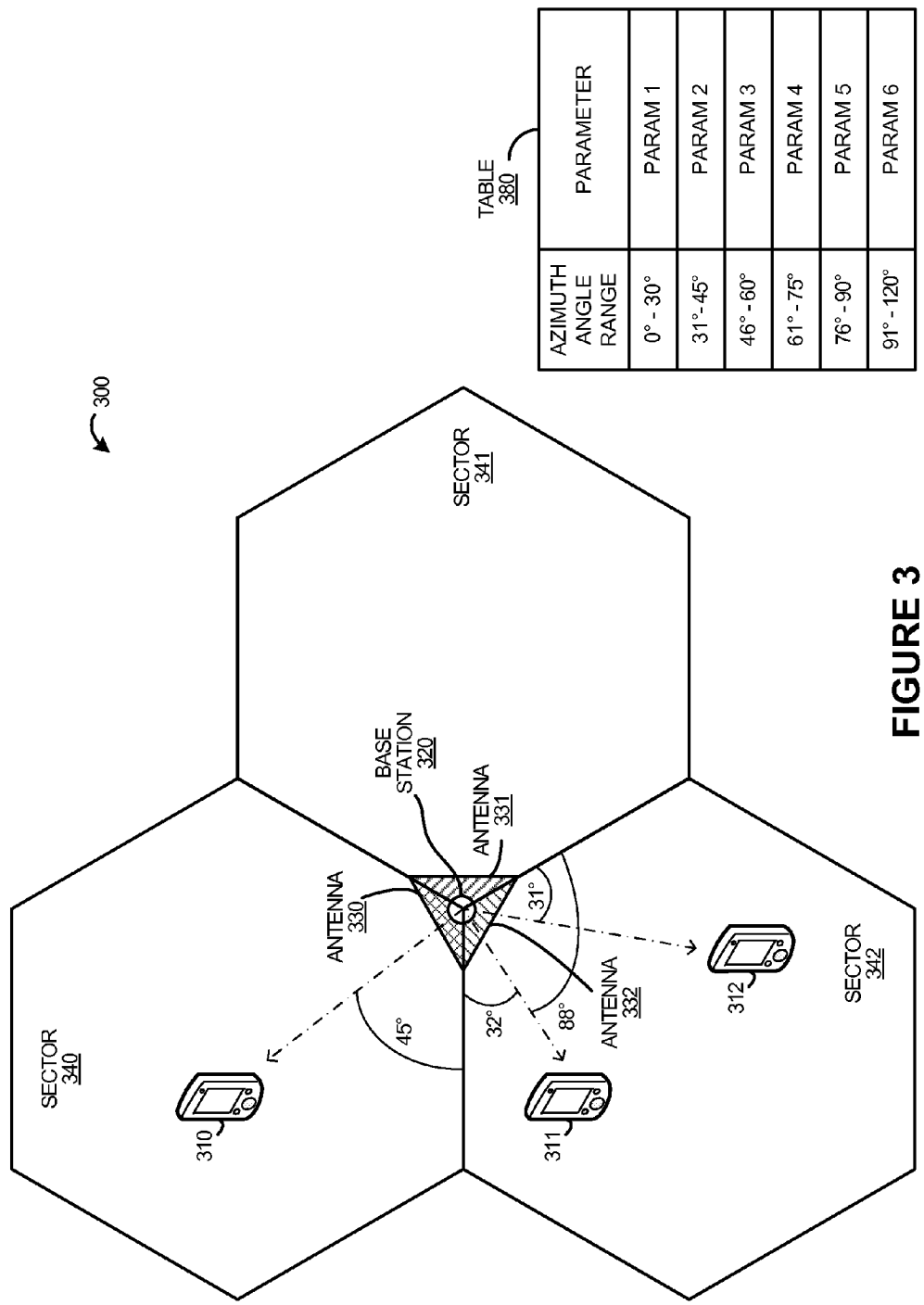

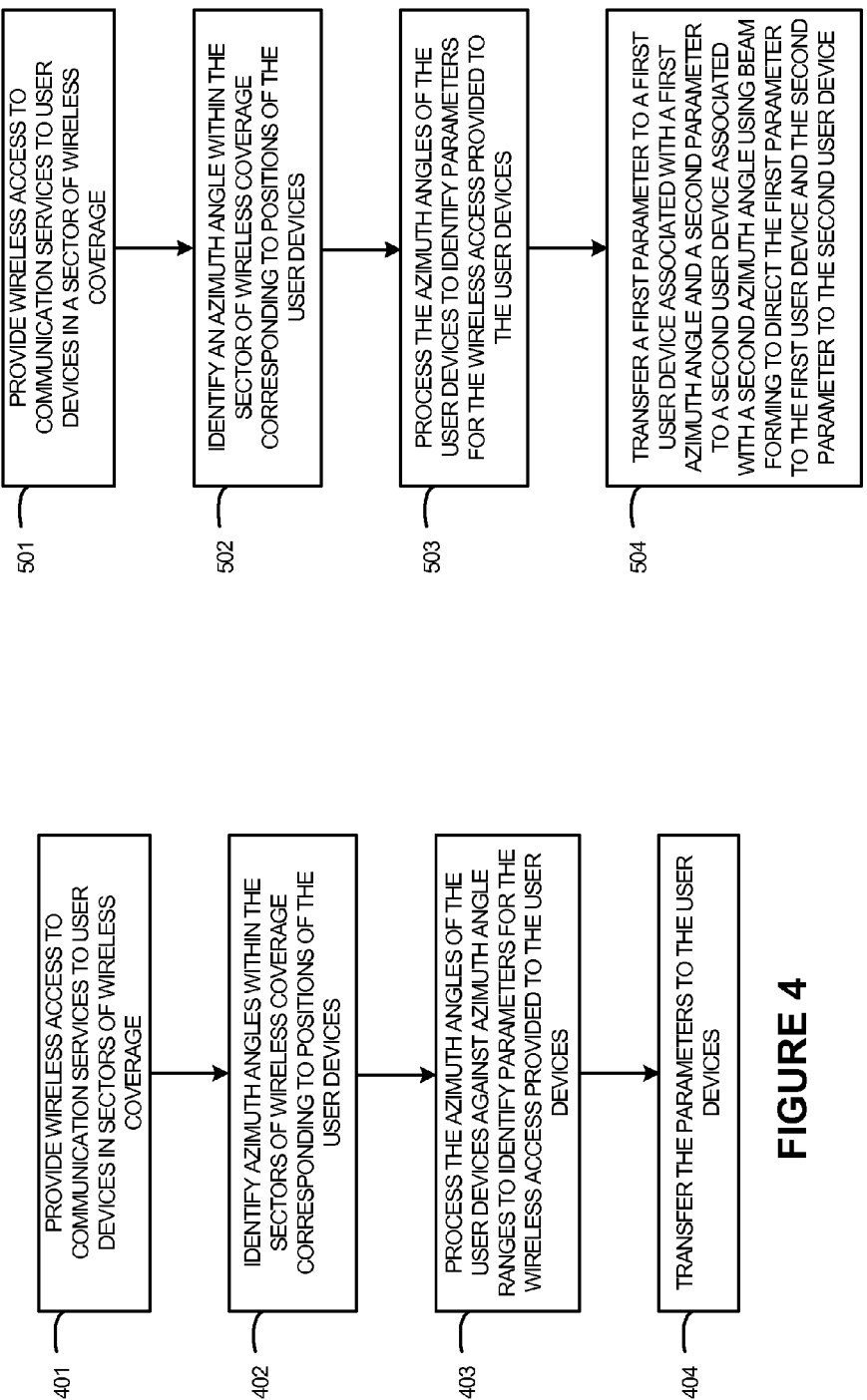

PARAMETERS FOR USER DEVICES IN WIRELESS ACCESS SYSTEMS BASED ON AZIMUTH ANGLE

TECHNICAL FIELD

Aspects of the disclosure are related to the field of communications, and in particular, providing parameters to user devices in wireless access systems based on azimuth angles within sectors of wireless coverage.

TECHNICAL BACKGROUND

Wireless communication systems typically include wireless access systems or radio access networks with equipment such as wireless access nodes along with various control nodes and routing nodes, which provide wireless access to communication services for user devices over wireless links. A typical wireless communication system includes systems to provide wireless access across a geographic region, with wireless coverage areas associated with individual wireless access nodes. The wireless access systems exchange user communications between user devices and service providers for the communication services. Communication services typically include voice calls, data exchange, web pages, streaming media, or text messages, among other communication services.

Within the individual wireless coverage areas, sectors can be defined which subdivide the coverage areas into smaller portions served by at least one antenna of a wireless access node. However, a sector of wireless coverage can often encompass geographic areas with a variety of physical features such as buildings, trees, water, parks, and the like which can affect the suitability of various wireless access parameters of the user devices. However, when a single sector encompasses varied physical features, such as both a building and a beach, the wireless access parameters provided to user devices in the building may not be suitable for user devices at the beach.

Overview

Systems, methods, and software for providing parameters to user devices in wireless access systems are provided herein. In one example, a method of operating a wireless communication system is provided. The method includes providing wireless access to communication services to a user device in a sector of wireless coverage. The method also includes identifying an azimuth angle within the sector of wireless coverage corresponding to a position of the user device, and processing at least the azimuth angle of the user device to identify at least one parameter for the wireless access provided to the user device. The method also includes transferring the at least one parameter to the user device.

In another example, a wireless communication system is provided. The wireless communication system includes a wireless access node configured to provide wireless access to communication services to a user device in a sector of wireless coverage. The wireless communication system also includes a processing system configured to identify an azimuth angle within the sector of wireless coverage corresponding to a position of the user device. The processing system is configured to process at least the azimuth angle of the user device to identify at least one parameter for the wireless access provided to the user device. The wireless access node is configured to transfer the at least one parameter to the user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 3 is a system diagram illustrating a communication system.

FIG. 4 is a flow diagram illustrating a method of operation of a communication system.

FIG. 5 is a flow diagram illustrating a method of operation of a communication system.

DETAILED DESCRIPTION

Figure 1:
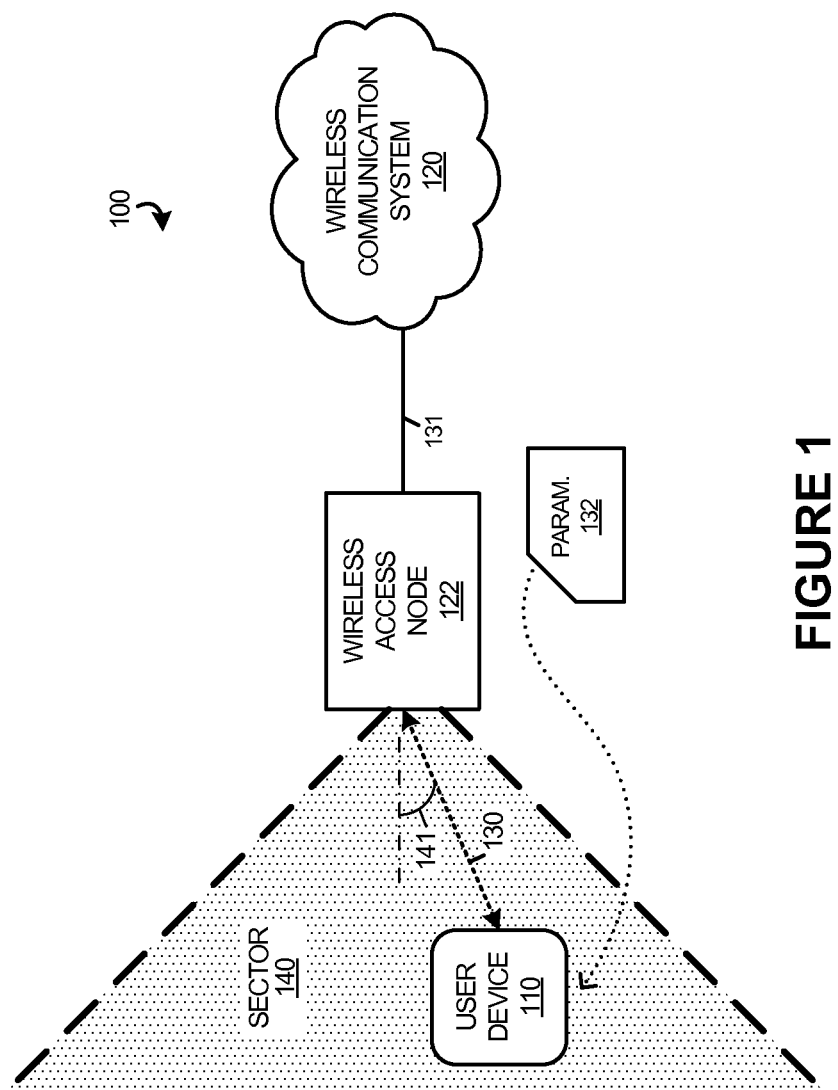
FIG. 1 is a system diagram illustrating a communication system.

FIG. 1 is a system diagram illustrating communication system 100.

Communication system 100 includes user device 110, wireless communication system 120, and wireless access node 122. User device 110 and wireless access node 122 communicate over wireless link 130. Wireless communication system 120 and wireless access node 122 communicate over link 131.

Wireless access node 122 communicates with wireless communication system 120 to provide the wireless access for user device 110. Wireless communication system 120 can include further wireless access nodes distributed over a geographic area to provide wireless coverage to many user devices, such as in cellular network systems. Wireless communication system 120 can include processing nodes, switching nodes, routing nodes, as well as other access and traffic handling systems.

Figure 2:
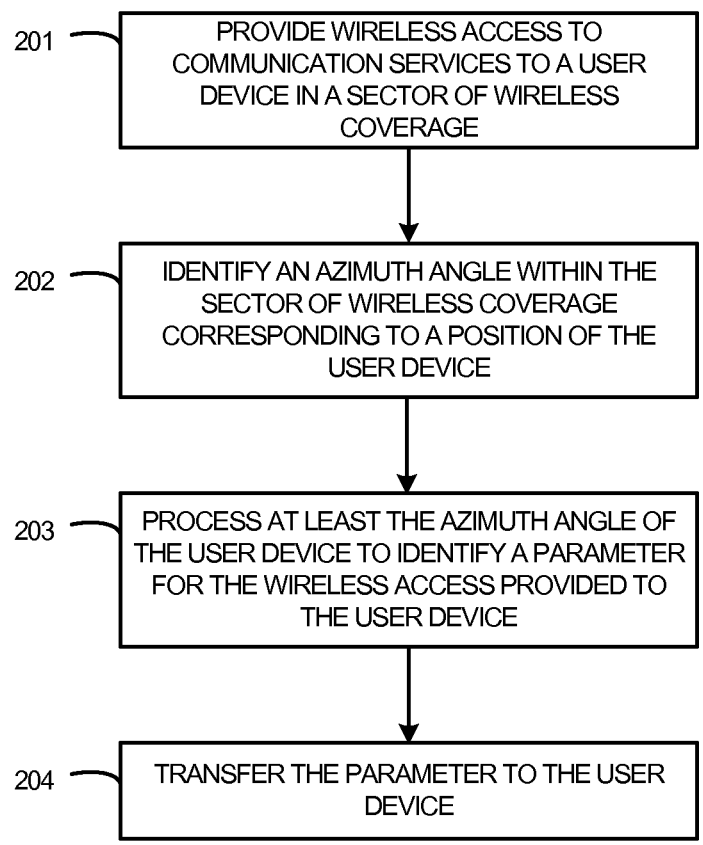
FIG. 2 is a flow diagram illustrating a method of operation of a communication system.

As a first example operation of communication system 100, FIG. 2 is presented. FIG. 2 is a flow diagram illustrating a method of operation of communication system 100. The operations of FIG. 2 are referenced below parenthetically. In FIG. 2, wireless access node 122 provides (201) wireless access to communication services to user device 110 in sector 140 of wireless coverage. User device 110 receives wireless access to communication services from wireless access node 122 over wireless link 130. The communication services can include voice calls, text messages, email, data transfer, and the like. Wireless access node 122 provides wireless coverage in at least one sector of wireless coverage, namely sector 140. Sector 140 is shown in a representative form in FIG. 1, and used to indicate an example RF coverage area for user devices.

Wireless access node 122 identifies (202) an azimuth angle within sector 140 of wireless coverage corresponding to a position of user device 110. As shown in FIG. 1, user device 110 is located at a position within sector 140 that corresponds to azimuth angle 141. In this example, azimuth angle 141 is measured from a midpoint of the total angular coverage of sector 140. For example, azimuth angle 141 could be 20 degrees from the center line of sector 140. It should be understood that the azimuth angle can instead be measured from either angular edge of sector 140.

The azimuth angle can be determined in many ways. For example, a geographic position or location of user device 110 can be identified and compared against a geographic position or location of wireless access node 122. A predetermined angular coverage of sector 140 can also be considered in determining azimuth angle 141, including an angular position or direction of an antenna or antenna array used to provide sector 140. The geographic position of user device 110 can be received from user device 110, such as when user device 110 includes global positioning system (GPS) equipment. In other examples, the geographic position of user device 110 is identified by triangulation between wireless access node 122 and other wireless access nodes. The geographic position of wireless access node 122 is typically fixed and predetermined.

Wireless access node 122 processes (203) at least azimuth angle 141 of user device 110 to identify a parameter for the wireless access provided to user device 110. In this example, parameter 132 is identified, and can include one or more parameters. Parameter 132 is related to wireless access for user device 110, and can be single-user user parameters specific to user device 110, or can be multi-user parameters or sector parameters applicable to all user devices receiving wireless access in sector 140.

Example single-user parameters include search window sizes for transmitting/receiving communications with wireless access node 122, traffic channel gain for traffic channels of wireless link 130, transmission power control parameters for user device 110, or other parameters. Example multi-user or sector parameters include wireless access node neighbor list information which can indicate other wireless access nodes to include in a neighbor list stored in user device 110 and used for handoffs. In further examples, parameter 132 can include multi-user parameters included in access parameter messages (APM) and system parameter messages (SPM), and the single-user parameters could include parameters included in extended channel assignment messages (ECAM), among other parameters.

Wireless access node 122 transfers (204) parameter 132 to user device 110. In this example, parameter 132 is transferred over wireless link 130. After receipt of parameter 132, user device 110 can operate over wireless link 130 according to parameter 132. In some examples, parameter 132 is determined by systems or equipment of wireless communication system 120, and transferred over link 131 for delivery to user device 110 by wireless access node 122. Although wireless access node 122 is described above as performing many of the operations, it should be understood that other systems can instead perform the operations, such as processing systems of wireless communication system 120.

FIG. 3 is a system diagram illustrating communication system 300. Communication system 300 includes user devices 310-312, base station 320, and sectors 340-342. FIG. 3 also includes table 380 indicating relationships between azimuth angle ranges and parameters, and will be discussed in more detail below. Although not shown for clarity in FIG. 3, communication system 300 can include further wireless communication system equipment, such as further base stations, switches, routers, access systems, and processing systems, including combinations thereof. User devices 310-312 are smartphone devices in this example.

Base station 320 includes RF transceiver equipment, antennas, amplifiers, and processing equipment. As shown in FIG. 3, base station 320 includes at least three antenna portions, namely antennas 330-332. Each antenna portion services user devices in a particular sector of wireless coverage. Antenna 330 services sector 340, antenna 331 services sector 341, and antenna 332 services sector 342. Antennas 330-332 can include one or more antennas, such as an antenna array, for transmitting and receiving wireless communications in the respective sector. Although each sector 340-342 is shown as a hexagonal shape in FIG. 3, these shapes are merely representative and other wireless coverage shapes can be used to show portions of wireless coverage.

As a first example operation of communication system 300, FIG. 4 is presented. FIG. 4 is a flow diagram illustrating a method of operation of communication system 300. The operations of FIG. 4 are referenced below parenthetically. In FIG. 4, base station 320 provides (401) wireless access to communication services to user devices in sectors of wireless coverage. The communication services can include voice calls, text messages, email, data transfer, and the like. Although not shown in FIG. 3 for clarity, each user device 310-312 communicates with base station 320 over an associated wireless link. Also as shown in FIG. 3, there are three sectors 340-342 of wireless coverage provided by base station 320. Each sector 340-342 is served by one associated antenna portion 330-332. User device 310 is located in sector 340, and user devices 311-312 are located in sector 342.

Base station 320 identifies (402) at least azimuth angles within the sectors of wireless coverage corresponding to positions of the user devices. As shown in FIG. 3, user device 310 has an azimuth angle of 45 degrees compared to a first edge of sector 340. User device 311 has an azimuth angle of 32 degrees compared to a first edge of sector 342 or 88 degrees from a second edge of sector 342. User device 312 has an azimuth angle of 31 degrees compared to the second edge of sector 324. It should be understood that the positions and azimuth angles of each user device are merely representative, and azimuth angles can be indicated relative to any reference point. Furthermore, in addition to azimuth angle, a distance of each user device from base station 320 can be identified.

The azimuth angles and distances can be determined in many ways. For example, a geographic position or location of user device 310-312 can be identified and compared against a geographic position or location of base station 320 or of an antenna portion of base station 320. A predetermined angular coverage of each sector 340-342 can also be considered in determining azimuth angles, including an angular orientation or direction of associated antenna portions 330-332. The geographic position of user devices 310-312 can be received from associated ones of user devices 310-312, such as when user devices 310-312 include global positioning system (GPS) equipment. In other examples, the geographic positions of user devices 310-312 are identified by triangulation between base station 320 and other base stations. In yet further examples, signal strengths of transmissions of each of user devices 310-312 can be employed to determine an azimuth angle, such as when a directional antenna is employed by base station 320. The geographic position of base station 320 is typically fixed and predetermined.

Base station 320 processes (403) at least the azimuth angles of the user devices against azimuth angle ranges to identify parameters for the wireless access provided to the user devices. Once the azimuth angles of user devices 310-312 have been determined, these azimuth angles are processed to determine associated wireless access parameters. As shown in FIG. 3, table 380 includes a first column indicating ranges of azimuth angles, each corresponding to the second column of wireless access parameters. Although 6 parameters are listed in table 380, any number of parameters can be listed, and each parameter 1-6 in table 380 can represent one or more wireless access parameter. Thus, base station 320 processes at least the azimuth angles for each of user devices 310-312 against the azimuth angle ranges of table 380 to determine parameters correlated therewith. In some examples, distances of each user device can also be processed to identify the parameters, including combinations of distances and azimuth angles.

The parameters are related to wireless access for user devices 310-312, and can be single-user user parameters specific to each user device, or can be multi-user parameters or sector parameters applicable to all user devices receiving wireless access in a particular sector. Example single-user parameters include search window sizes for transmitting/receiving communications with base station 320, traffic channel gain for traffic channels of wireless links with base station 320, transmission power control parameters for user devices, or other parameters. Example multi-user or sector parameters include wireless access node neighbor list information which can indicate other wireless access nodes to include in a neighbor list stored in each user devices. In further examples, parameters can include multi-user parameters such as parameters included in access parameter messages (APM) and system parameter messages (SPM), and single-user parameters such as parameters included in extended channel assignment messages (ECAM), among other parameters.

Base station 320 transfers (404) the parameters to the user devices. In this example, parameters are transferred over wireless links to each associated user device. After receipt of the parameters, each user device can operate over wireless links with base station 320 according to the associated parameters. In some examples, the parameters are determined by systems or equipment of an associated wireless communication system, and transferred for delivery to user devices by base station 320. Although base station 320 is described above as performing many of the operations, it should be understood that other systems can instead perform the operations.

As a second example operation of communication system 300, FIG. 5 is presented. FIG. 5 is a flow diagram illustrating a method of operation of communication system 300. The operations of FIG. 5 are referenced below parenthetically. In FIG. 5, base station 320 provides (501) wireless access to communication services to user devices in a sector of wireless coverage. The communication services can include voice calls, text messages, email, data access, and the like. Although not shown in FIG. 3 for clarity, each user device 310-312 communicates with base station 320 over an associated wireless link. Also as shown in FIG. 3, there are three sectors 340-342 of wireless coverage provided by base station 320. Each sector 340-342 is served by one associated antenna portion 330-332. User device 310 is located in sector 340, and user devices 311-312 are located in sector 342.

Base station 320 identifies (502) an azimuth angle within the sector of wireless coverage corresponding to positions of the user devices. In this example, sector 342 will be discussed for the operations of FIG. 5. As shown in FIG. 3, user device 311 has an azimuth angle of 32 degrees compared to a first edge of sector 342 or 88 degrees from a second edge of sector 342. User device 312 has an azimuth angle of 31 degrees compared to the second edge of sector 324. It should be understood that the positions and azimuth angles of each user device are merely representative, and azimuth angles can be indicated relative to any reference point. The azimuth angles can be determined in the various ways as discussed herein.

Base station 320 processes (503) the azimuth angles of the user devices to identify parameters for the wireless access provided to the user devices. Once the azimuth angles of user devices 311-312 have been determined, these azimuth angles are processed to determine associated wireless access parameters. As shown in FIG. 3, table 380 includes a first column indicating ranges of azimuth angles, each corresponding to the second column of wireless access parameters. Thus, base station 320 processes the azimuth angles for each of user devices 311-312 against the azimuth angle ranges of table 380 to determine parameters correlated therewith.

The parameters are related to wireless access for user devices 311-312, and can be single-user user parameters specific to each user device, or can be multi-user parameters or sector parameters applicable to all user devices receiving wireless access in a particular sector such as sector 342 being discussed in this example. Example parameters are discussed above in the previous examples.

Base station 320 transfers (504) a first parameter to first user device 311 associated with a first azimuth angle and a second parameter to second user device 312 associated with a second azimuth angle using beam forming to direct the first parameter to first user device 311 and the second parameter to second user device 312. In this example, parameters are transferred over wireless links to each associated user device.

In the transfer of single-user parameters, base station 320 can transfer the single-user parameters without beam forming techniques, merely in overhead communications which can be received by any user device but selectively addressed to a particular user device. However, in the transfer of multi-user parameters, such as sector-wide or global parameters, all user devices receiving wireless access in the sector would receive and respond to the multi-user parameters as they are not typically addressed to a particular user device. Thus, if different parameters are intended for user devices at different azimuth angles, one example method is to transfer different multi-user parameters to different user devices using beam forming. Beam forming includes the process of directing an RF signal over a first angular range and attenuating the same RF signal over a second angular range.

Base station 320 uses antenna portion 332 to direct the first multi-user parameters at user device 311, and likewise any other user devices proximate to the azimuth angle of user device 311. The beam forming for the transfer of the first multi-user parameters attenuates the RF signal for user devices not proximate to the azimuth angle of user device 311, such as user device 312, and thus user device 312 would be prevented from receiving the first multi-user parameters. Base station 320 uses antenna portion 332 to direct the second multi-user parameters at user device 312, and any other user devices proximate to the azimuth angle of user device 312. The beam forming for the transfer of the second multi-user parameters attenuates the RF signal for user devices not proximate to the azimuth angle of user device 312, such as user device 311, and thus user device 311 would be prevented from receiving the second multi-user parameters.

In further examples, antenna portion 332 includes a single antenna array, such as a phased array antenna array. Transferring multi-user parameters to a first user device can include transmitting, using the single antenna array, the multi-user parameters using beam forming to direct the multi-user parameters to user devices associated with or proximate to the azimuth angle of the first user device and attenuate receipt of the multi-user parameters by further user devices not associated with or proximate to the azimuth angle.

Various directional antennas or antenna arrays can be employed in beam forming. For example, a phased array antenna can dynamically and selectively direct or attenuate an RF signal based on an angle (such as azimuth or elevation) without physically changing an orientation of the antenna array. Other directional antennas can be employed such as yagi, dish, or parabolic antennas, however, dynamically altering the attenuation angle can be more time consuming than in phased array antenna systems. In some examples, motor mechanisms are employed to alter a transmission angle of a directional antenna.

After receipt of the parameters, each user device can operate over wireless links with base station 320 according to the associated parameters. As user devices 310-312 move, different azimuth angles can be determined and associated parameters transferred thereto. In some examples, the parameters are determined by systems or equipment of an associated wireless communication system, and transferred for delivery to user devices by base station 320. Although base station 320 is described above as performing many of the operations, it should be understood that other systems can instead perform the operations.

Figure 6:
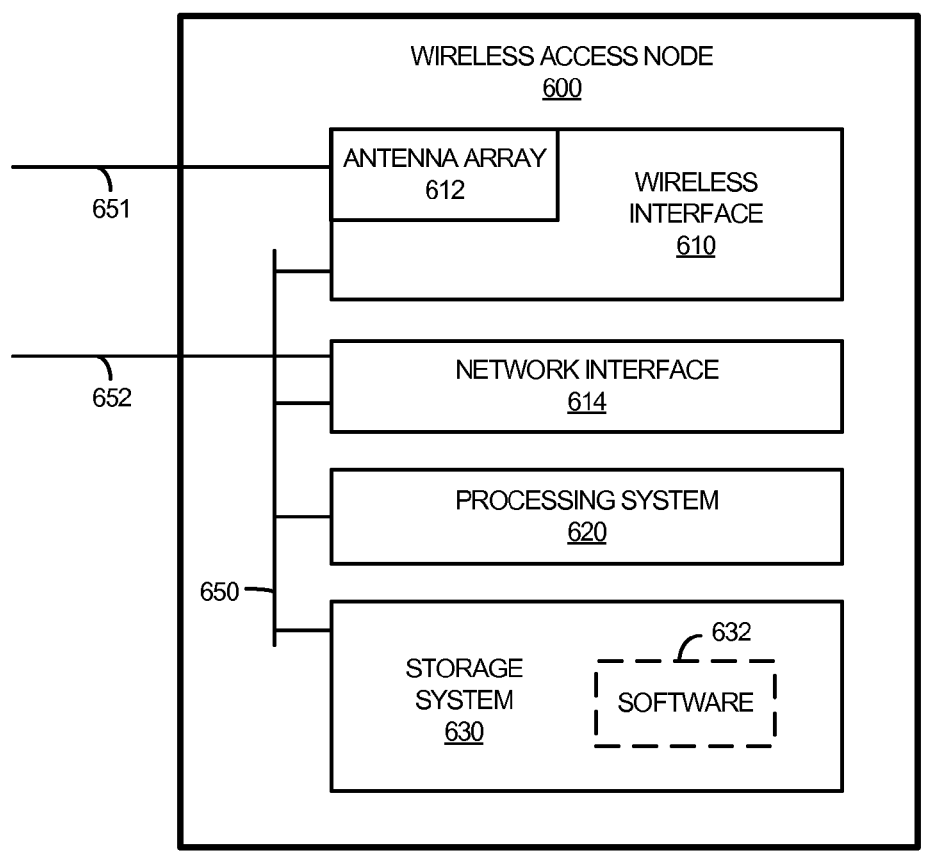
FIG. 6 is a block diagram illustrating a wireless access node.

FIG. 6 is a block diagram illustrating a detailed view of wireless access node 600. Wireless access node 600 can include equipment and systems as discussed herein for wireless access node 122 in FIG. 1 or base station 320 of FIG. 3, although variations are possible. Wireless access node 600 includes wireless interface 610, antenna array 612, network interface 614, processing system 620, and storage system 630. In operation, processing system 620 is operatively linked to wireless interface 610, network interface 614, and storage system 630 by bus 650. It should be understood that discrete links can be employed, such as network links or other circuitry. Wireless access node 600 can be distributed or consolidated among equipment or circuitry that together forms the elements of wireless access node 600. Wireless access node 600 can optionally include additional devices, features, or functionality not discussed here for purposes of brevity.

Wireless interface 610 comprises one or more communication interfaces for communicating with wireless communication devices, such as user devices. Wireless interface 610 could include transceiver equipment for wirelessly exchanging user communications and overhead communications with user devices, omitted for clarity, using antenna array 612 and the associated wireless link 551. Wireless interface 610 also receives command and control information and instructions from processing system 620 or network interface 614 for controlling the operations of user devices over wireless link 551, coordinating handoffs of user devices between base stations or other wireless access systems, exchanging authentication or authorization information with other wireless communication networks, providing parameters to user devices, and transferring communications for delivery to user devices. Wireless link 551 could use various protocols or communication formats as described herein for wireless link 140 in FIG. 1, including combinations, variations, or improvements thereof.

Antenna array 612 comprises one or more antenna elements, RF coupling equipment, structural supports, cabling, or other equipment. In some examples, elements of antenna array 612 can comprise a directed antenna array, such as a yagi antenna, dish antenna, parabolic antenna, or phased antenna array to establish beam forming during transmissions to user devices.

Network interface 614 includes a network interface for communicating with one or more communication networks, such as wireless communication system 120, among others. The network interface can include a T1 interface, or local or wide area network communication interfaces which can communicate over one or more Ethernet or Internet protocol (IP) links. Examples of network interface 614 include network interface card equipment, transceivers, modems, and other communication circuitry. In this example, network interface 614 communicates over link 652. Link 652 can include one or more communication links as described herein, such as that described for link 131 in FIG. 1.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 632. Storage system 630 can include volatile and nonvolatile, removable and non-removable media implemented in any method or technology for storage of information, such as computer readable instructions, data structures, program modules, or other data. In some examples, storage system 630 includes a data structure that associates azimuth angles with various wireless access parameters, such as illustrated in table 380 of FIG. 3.

In addition to storage media, in some implementations storage system 630 can also include communication media over which software 632 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 can be implemented in program instructions and among other functions can, when executed by wireless access node 600 in general or processing system 620 in particular, direct wireless access node 600 or processing system 620 to provide wireless access to communication services for user devices, identify azimuth angles of user devices, process azimuth angles of user devices to identify parameters for wireless access, and transfer the parameters to user devices, among other operations. Software 632 can include additional processes, programs, or components, such as operating system software, database software, or application software. Software 632 can also comprise firmware or some other form of machine-readable processing instructions executable by processing system 620.

In at least one implementation, the program instructions can include first program instructions that direct processing system 620 to instruct wireless interface 610 to provide wireless access to communication services for user devices. The first program instructions also direct processing system 620 to identify azimuth angles of user devices, process azimuth angles of user devices to identify parameters for wireless access, and instruct wireless interface 610 to transfer the parameters to user devices, among other operations.

In some implementations, the program instructions can include second program instructions that direct processing system 620 to instruct wireless interface 610 to provide wireless access to communication services for user devices in a sector of wireless coverage. The second program instructions also direct processing system 620 to identify azimuth angles within the sector of wireless coverage corresponding to positions of the user devices, process the azimuth angles of the user devices to identify parameters for the wireless access, and instruct wireless interface 610 to transfer a first parameter to a first user device associated with a first azimuth angle and a transfer a second parameter to a second user device associated with a second azimuth angle using beam forming to direct the first parameter to the first user device and the second parameter to the second user device, among other operations.

In general, software 632 can, when loaded into processing system 620 and executed, transform processing system 620 overall from a general-purpose computing system into a special-purpose computing system customized to provide wireless access to communication services for user devices, identify azimuth angles of user devices, process azimuth angles of user devices to identify parameters for wireless access, and transfer the parameters to user devices, among other operations. Encoding software 632 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 can transform the physical state of the semiconductor memory when the program is encoded therein. For example, software 632 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Wireless access node 600 can also include other elements, such as user interfaces, computer systems, databases, distributed storage and processing elements, and the like. Wireless access node 600 can be included in the equipment or systems of wireless communication system 120 of FIG. 1, or can be included in separate equipment or systems, including combinations thereof.

Referring back to FIG. 1, user device 110 can comprise one or more antennas, transceiver circuitry elements, and communication elements. The transceiver circuitry typically includes amplifiers, filters, modulators, and signal processing circuitry. User device 110 can also include user interface systems, memory devices, non-transitory computer-readable storage mediums, software, processing circuitry, or some other communication components. User device 110 can be subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication system 120 comprises communication and control systems for providing access to communication services for user devices. Wireless communication system 120 can provide communication services including voice calls, text messages, data access, or other communication services provided over cellular or wireless communication networks. In some examples, wireless communication system 120 includes equipment to provide wireless access to communication services within different coverage areas to user devices, route communications between content providers and user devices, and facilitate handoffs between equipment of different coverage areas, among other operations. Wireless communication system 120 can also comprise elements such as radio access network (RAN) equipment, E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless access node 122 is associated with wireless communication system 120, and provides wireless links for wireless access to the communication services of wireless communication system 120. Wireless access node 122 comprises RF communication and control circuitry, transceivers, and antennas, as well as wireless communications equipment capable of communicating with and providing wireless access within a wireless coverage area to communication services for wireless communication devices, such as user device 110 in sector 140. The RF communication circuitry typically includes amplifiers, filters, RF modulators, transceivers, and signal processing circuitry. Wireless access node 122 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Communication link 131 uses metal, glass, optical, air, space, or some other material as the transport media. Communication link 131 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 131 can be a direct link or can include intermediate networks, systems, or devices, and can include a logical network link transported over multiple physical links.

Wireless link 130 can use the air or space as the transport media. Wireless link 130 comprises one or more wireless communication links provided over an associated wireless frequency spectrum or wireless frequency band, and can use various protocols. Wireless link 130 can comprise a wireless link such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for wireless link 130 is shown in FIG. 1, it should be understood that wireless link 130 is merely illustrative to show communication modes or wireless access pathways for user device 110. In other examples, further wireless links can be shown, with portions of the further wireless links shared and used for different communication sessions or different content types, among other configurations.

Communication links 130-131 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   providing wireless access to communication services to a user device in a sector of wireless coverage;
   identifying an azimuth angle within the sector of wireless coverage corresponding to a position of the user device, wherein the azimuth angle is based on a geographic position of the user device compared against a geographic location of a wireless access node associated with the sector of wireless coverage;
   processing at least the azimuth angle of the user device to identify at least one parameter for the user device to use when obtaining the wireless access provided to the user device within the sector, wherein the one parameter does not identify the sector; and
   transferring the at least one parameter to the user device.

2. The method of claim 1, wherein processing at least the azimuth angle of the user device to identify the at least one parameter for the wireless access provided to the user device comprises selecting the at least one parameter for the wireless access based on the azimuth angle of the user device.

3. The method of claim 2, wherein selecting the at least one parameter for the wireless access based on the azimuth angle of the user device comprises comparing the azimuth angle against a plurality of azimuth angle ranges and selecting the parameter based on one of the plurality of azimuth angle ranges corresponding to the azimuth angle.

4. The method of claim 1, wherein the parameter comprises a user parameter of at least one of a search window size and a traffic channel gain.

5. The method of claim 1, wherein the parameter comprises a sector parameter for many user devices comprising a wireless access node neighbor list information.

6. The method of claim 5, wherein transferring the at least one parameter to the user device comprises transmitting the sector parameter using beam forming to direct the sector parameter to user devices associated with the azimuth angle and attenuate receipt of the sector parameter by further user devices not associated with the azimuth angle.

7. The method of claim 1, further comprising:
   providing wireless access to communication services to a second user device in the sector of wireless coverage;
   identifying a second azimuth angle within the sector of wireless coverage corresponding to a position of the second user device;
   processing at least the second azimuth angle of the second user device to identify at least a second parameter for the wireless access provided to the second user device, wherein the second parameter comprises a different value than the parameter; and
   transferring the second parameter to the second user device.

8. The method of claim 1, wherein a wireless access node provides the sector of wireless coverage using a single antenna array.

9. The method of claim 8, wherein transferring the at least one parameter to the user device comprises transmitting, using the single antenna array, the at least one parameter using beam forming to direct the at least one parameter to user devices associated with the azimuth angle and attenuate receipt of the at least one parameter by further user devices not associated with the azimuth angle.

10. A wireless communication system, comprising:
    a wireless access node configured to provide wireless access to communication services to a user device in a sector of wireless coverage;
    a processing system configured to identify an azimuth angle within the sector of wireless coverage corresponding to a position of the user device, wherein the azimuth angle is based on a geographic position of the user device compared against a geographic location of a wireless access node associated with the sector of wireless coverage;
    the processing system configured to process at least the azimuth angle of the user device to identify at least one parameter for the user device to use when obtaining the wireless access provided to the user device within the sector, wherein the one parameter does not identify the sector; and
    the wireless access node configured to transfer the at least one parameter to the user device.

11. The wireless communication system of claim 10, comprising:
    the processing system configured to select the at least one parameter for the wireless access based on the azimuth angle of the user device.

12. The wireless communication system of claim 11, comprising:
    the processing system configured to compare the azimuth angle against a plurality of azimuth angle ranges and select the parameter based on one of the plurality of azimuth angle ranges corresponding to the azimuth angle.

13. The wireless communication system of claim 10, wherein the parameter comprises a user parameter of at least one of a search window size and a traffic channel gain.

14. The wireless communication system of claim 10, wherein the parameter comprises a sector parameter for many user devices comprising a wireless access node neighbor list information.

15. The wireless communication system of claim 14, comprising:

the wireless access node configured to transmit the sector parameter using beam forming to direct the sector parameter to user devices associated with the azimuth angle and attenuate receipt of the sector parameter by further user devices not associated with the azimuth angle.

16. The wireless communication system of claim 10, comprising:

the wireless access node configured to provide wireless access to communication services to a second user device in the sector of wireless coverage;

the processing system configured to identify a second azimuth angle within the sector of wireless coverage corresponding to a position of the second user device;

the processing system configured to process at least the second azimuth angle of the second user device to identify at least a second parameter for the wireless access provided to the second user device, wherein the second parameter comprises a different value than the parameter; and the wireless access node configured to transfer the second parameter to the second user device.

17. The wireless communication system of claim 10, wherein the wireless access node provides the sector of wireless coverage using a single antenna array.

18. The wireless communication system of claim 17, comprising: the wireless access node configured to transmit, using the single antenna array, the at least one parameter using beam forming to direct the at least one parameter to user devices associated with the azimuth angle and attenuate receipt of the at least one parameter by further user devices not associated with the azimuth angle.

* * * * *